United States Patent [19]

Kobayashi et al.

[11] Patent Number: 4,957,980

[45] Date of Patent: Sep. 18, 1990

[54] POLYESTER RESIN COMPOSITION AND HOLLOW MOLDED ARTICLE THEREOF

[75] Inventors: Shigeo Kobayashi; Toshio Hiramatsu; Katsumasa Yamamoto; Nobuhiko Ichikawa, all of Ohtsu, Japan

[73] Assignee: Toyo Boseki Kabushiki Kaisha, Osaka, Japan

[21] Appl. No.: 229,463

[22] Filed: Aug. 8, 1988

[51] Int. Cl.⁵ .............................................. C08L 77/00
[52] U.S. Cl. ..................... 525/425; 525/181; 525/182; 525/420; 525/423; 525/931; 428/35.7
[58] Field of Search ................................ 525/425, 931

[56] References Cited

U.S. PATENT DOCUMENTS

| | | | |
|---|---|---|---|
| 4,119,607 | 10/1978 | Gergen et al. | 525/425 |
| 4,732,934 | 3/1988 | Hathaway et al. | 525/425 |
| 4,788,249 | 11/1988 | Maresca et al. | 525/432 |

*Primary Examiner*—Ana L. Carrillo
*Attorney, Agent, or Firm*—Wegner & Bretschneider

[57] ABSTRACT

A polyester resin composition having excellent gas barrier properties and transparency which comprises 100 parts by weight of a thermoplastic polyester resin (A), 1 to 100 parts by weight of a polyamide resin having metaxylylene group (B) and 0.01 to 50 parts by weight of a compatibilizing agent (C); and a polyester hollow molded article in the form of a single or multi-layered hollow molded article, wherein at least one of the layers is made of the above polyester resin composition.

1 Claim, No Drawings

POLYESTER RESIN COMPOSITION AND HOLLOW MOLDED ARTICLE THEREOF

FIELD OF INVENTION

The present invention relates to a polyester resin composition having excellent gas barrier properties and transparency, and a hollow molded article thereof. More particularly, the polyester resin composition having excellent gas barrier properties and transparency of the present invention comprises a thermoplastic polyester resin, a polyamide resin having metaxylylene group and a compatibilizing agent which combines both resin ingredients.

BACKGROUND OF THE INVENTION

Heretofore, a thermoplastic polyester resin, mainly polyethylene terephthalate, has been widely used for various vessels and packing materials in the form of films or sheets because, in addition to excellent mechanical properties, the resin has gas barrier properties, transparency, chemical resistance, aroma-keeping properties, hygienic qualities and the like. Particularly, with the progress of blow molding technique, especially biaxial orientation blow molding technique, utilization thereof as hollow vessels such as bottles and cans has been remarkably developed.

However, vessels made of a thermoplastic polyester resin, mainly polyethylene terephthalate by biaxial orientation technique do not necessarily satisfy all requisite properties. Particularly, gas barrier properties thereof against oxygen are insufficient and these vessels are not suitable for packing food which requires high gas barrier properties.

As a resin having gas barrier properties, there has been known a saponified vinyl acetate copolymer. However, it is a crystalline resin and, when it is added to a thermoplastic polyester resin, orientation blow moldability is impaired. Further, the resulting hollow molded article shows pearl-like devitrification and does not have any substantial function as a transparent vessel. In addition, desired gas barrier properties thereof is hardly expected.

When a styrene-acrylonitrile copolymer is added, there is a drawback that the composition obtained can not be sufficiently oriented at an orientation temperature suitable for a polyester resin because of a high glass transition temperature (Tg) of the copolymer. Further, there is another drawback that the copolymer is a non-crystalline resin and orientation crystallization can not be introduced by orientation, which results in deformation of the resulting vessel due to an orientation release stress.

In the case of a simple blend of a thermoplastic resin and a polyamide resin having metaxylylene group, transparency of the resulting vessel is remarkably decreased and the use thereof is extremely limited.

The present inventors have intensively studied the oxygen barrier, mechanical, and transparency properties of thermoplastic polyester resins. Their study resulted in the discovery that adding a polyamide resin having a metaxylylene group and a compatibilizing agent to a thermoplastic polyester resin improves oxygen barrier properties without a deterioration of the mechanical and transparency properties.

OBJECTS OF THE INVENTION

One object of the present invention is to provide a polyester resin composition having excellent gas barrier properties and transparency.

Another object of the present invention is to provide a hollow molded article made of the polyester resin composition.

These objects as well as other objects and advantages of the present invention will become apparent to those skilled in the art from the following description.

SUMMARY OF THE INVENTION

The present invention provides a polyester resin composition which comprises 100 parts by weight of a thermoplastic polyester resin (A), 1 to 100 parts by weight of a polyamide resin having a metaxylylene group (B) and 0.01 to 50 parts by weight of a compatibilizing agent (C).

Further, the present invention provides a polyester hollow molded article in the form of a single or multilayered hollow molded article, wherein at least one of the layers is made of the above polyester resin composition of the present invention.

DETAILED DESCRIPTION OF THE INVENTION

A thermoplastic polyester resin (A) of the present invention is a polyester resin prepared by using terephthalic acid, isophthalic acid, diphenyl ether-4,4-dicarboxylic acid, naphthalene-1,4- or 2,6-dicarboxylic acid, adipic acid, sebacic acid, decane-1,10-dicarboxylic acid, hexahydroterephthalic acid, etc. as its acid component; and ethylene glycol, propylene glycol, 1,4-butanediol, neopentyl glycol, diethylene glycol, cyclohexane dimethanol, 2,2-bis(4-hydroxyphenyl)propane, 2,2-bis(4-hydroxyethoxyphenyl)-propane, etc. as its glycol component; or p-hydroxybenzoic acid, p-hydroxyethoxybenzoic acid, etc. as a hydroxy acid. Preferably, the polyester resin is mainly composed of an ethylene terephthalate repeating unit wherein not less than 80 mol %, preferably, not less than 90 mol % of the acid component is terephthalic acid and not less than 80 mol %, preferably, not less than 90 mol % of the glycol component is ethylene glycol.

Preferably, the thermal polyester resin of the present invention has an intrinsic viscosity of not less than 0.55, more preferably 0.65 to 1.4. When the intrinsic viscosity is less than 0.55, it is difficult to obtain a parison which is a precursor molded article of a vessel in an amorphous transparent state and, in addition, mechanical properties of the resulting vessel becomes insufficient.

The polyamide resin having a metaxylylene group (B) used in the present invention is a polymer containing at least 70 mol % of a constituent unit formed from metaxylylenediamine or a mixed xylylenediamine containing metaxylylenediamine and not more than 30% of paraxylylenediamine based on the total amount thereof, and $\alpha$, $\omega$-aliphatic dicarboxylic acid having 4 to 10 carbon atoms in the molecular chain thereof.

Examples of these polymers include homopolymers such as polymetaxylylene adipamide, polymetaxylylene sebacamide, polymetaxylylene suberamide and the like; copolymers such as methaxylylene/paraxylylene adipamide copolymer, methaxylylene/paraxylylene pimelamide copolymer, methaxylylene/paraxylylene azelamide copolymer and the like; and copolymers obtained by copolymerizing the above homopolymer or copolymer component and an aliphatic diamine such as hexamethylenediamine, an alicyclic diamine such as piperazine, an aromatic diamine such as para-bis(2-aminoethyl)benzene, an aromatic carboxylic acid such as terephthalic acid, a lactam such as ε-caprolactam, ω-aminocarboxylic acid such as γ-aminoheptanoic acid, and an aromatic aminocarboxylic acid. In the above copolymer, the amount of paraxylylenediamine is not more than 30% based on the total amount of xylylenediamine and the amount of the constituent unit formed by xylylenediamine and an aliphatic dicarboxylic acid is not less than 70 mol % in a molecular chain thereof.

The polyamide resin having metaxylylene group (hereinafter referred to as "MXD resin") itself is fragile in an amorphous state and, therefore, it is necessary that its relative viscosity is normally not less than 1.5, preferably, 2.0 to 4.0.

In the present invention, the above MXD resin can be formulated in an amount of 1 to 100 parts by weight, preferably, 5 to 60 parts by weight per 100 parts by weight of the thermoplastic polyester resin.

The compatibilizing agent (C) used in the present invention can finely disperse MXD resin in the thermoplastic polyester resin to remarkably improve transparency of a molded article obtained from the polyester resin composition of the present invention.

The compatibilizing agent can be obtained by grafting an unsaturated carboxylic acid or its derivative on a copolyester resin having good molecular compatibility with polyethylene terephthalate and containing as its component one or more members selected from the group consisting of aliphatic dicarboxylic acids such as sebacic acid, adipic acid, dodecane 1,12-dicarboxylic acid and the like, cyclohexane dimethanol, and hydrogenated dimethyl terephthalate. The unsaturated carboxylic acid of compatibilizing agent or a derivative thereof, includes maleic acid, fumaric acid, itaconic acid, acrylic acid, crotonic acid, and anhydrides thereof.

The term "molecular compatibility" means that, when a composition is kneaded, the ingredients can be thoroughly mixed from the viewpoint of molecular levels and the composition has a substantial single glass transition temperature determined by DSC or a viscoelasticity measurement.

As the compatibilizing agent, there can also be used a compound having an oxazoline ring, for example, oxazoline compounds such as 2,2'-(1,3-phenylene)bis(2-oxazoline), 2-phenyl-2-oxazoline and the like.

Further, as the compatibilizing agent, there can also be used a compound having an epoxy group and an acid anhydride group in the molecule. For example, such epoxy and acid anhydride groups are possible when the compatibilizing agent is synthesized from glycidyl methacrylate, allyl glycidyl ether or the like, and an acid anhydride such as maleic anhydride, fumaric anhydride or the like.

Furthermore, as the compatibilizing agent, there can also be used a polyepoxy compound, for example, a reaction product of epichlorohydrin and a polyhydric alcohol. Although it is not limited to specific compounds, examples thereof include polyglycidyl ethers of polyhydric alcohols such as ethylene glycol, propylene glycol, neopentyl glycol, tetramethylene glycol, bisphenol A and the like, or alkylene oxide adducts of these polyhydric alcohols; diglycidyl ethers of polyalkylene glycols; glycidyl esters of carboxylic acids having polyoxyalkylene chains. Preferably, it is a polyepoxy compound having a polyoxyalkylene chain and epoxy group and, preferably, diglycidyl ethers of polyalkylene glycols or their derivatives.

The compatibilizing agent (C) of the present invention can be formulated in amounts of 0.01 to 50 parts by weight, preferably, 0.02 to 30 parts by weight per 100 parts by weight of polyester resin, although the amount varies depending upon a particular kind of the compatibilizing agent.

In the present invention, various additives such as antioxidants, UV absorbing agents, antistatic agents, transparent colorants and the like can be formulated according to a particular purpose and use of the composition.

A method for producing the polyester resin composition of the present invention is not limited to a specific one and it can be produced according to a known method. For example, the polyester resin composition of the present invention can be produced by mechanically kneading the desired ingredients in an extruder, a roll mill, Banbury mixer or the like, or it can be produced by multi-stage kneading such that the polyester resin previously kneaded with the compatibilizing agent is kneaded with MXD resin ingredient.

The polyester resin composition of the present invention can be used for molding films, sheets, hollow vessels such as bottles, cans and the like and, when it is oriented after molding, its mechanical properties, gas barrier properties and transparency are further improved.

As a method for producing the polyester hollow molded article of the present invention, there can be employed, for example, a method comprising dry-blending the above ingredients (A), (B) and (C) in desired concentrations and directly molding in a hollow article molding machine; or a method comprising melt-kneading the desired ingredients in an extruder to obtain pellets and then molding the pellets in a hollow article molding machine or the like.

The hollow molded article of the present invention can be produced by the same hollow molding method as that of a conventional polyester resin.

For example, there can be employed extrusion blow molding referred to as "direct blowing method" or a molding method referred to as "injection blow", wherein a parison is molded by injection molding and it is blow-molded with compressed gas without cooling completely. There can be also employed a molding method referred to as "biaxial orientation blow molding", wherein a closed-end parison is injection-molded or extrusion molded, the temperature of the parison is adjusted to that suitable for orientation, for example, 70° to 150° C. in an orientation blow device and it is blow-molded by an orientation rod toward the axial direction and by compressed gas toward the radial direction, simultaneously or sequentially.

The following Examples and Comparative Examples further illustrate the present invention in detail but are not to be construed to limit the scope thereof. In the Examples and Comparative Examples, all "parts" and "% s'" are by weight unless otherwise stated.

The methods for measuring main characteristic properties determined in the present invention are as follows.

(1) Intrinsic viscosity [η] of the polyester resin: It was measured at 30° C. by using the mixed solvent of phenol-tetrachloroethane (6:4, w/w).

(2) Relative viscosity [η rel] of MXD resin: It was measured at 25° C. by dissolving the resin (lg) in 96% sulfuric acid (100 ml).

(3) Transparency and haze: Haze mater-S manufactured by Toyo Seiki K.K. was used and, according to JIS-K6714, these were calculated as follows;

$$\text{Transparency} = (T_2/T_1) \times 100 \ (\%)$$

$$\text{Haze} = \frac{T_4 - T_3 (T_2/T_1)}{T_2} \times 100 \ (\%)$$

wherein $T_1$ is an amount of incident light, $T_2$ is a total amount of transmitted light, $T_3$ is an amount of light scattered by the device and $T_4$ is an amount of light scattered by the device and the sample.

(4) Amount of oxygen permeation: It was determined by measuring an amount of permeation per one 1000 cc bottle at 20° C. with an oxygen transmission measuring device, OX-TRAM100 manufactured by Modern Controls CO. in U.S.A. (cc/bottle.24 hr.atm).

(5) Tensile properties: By using a strip specimen of 10 mm in width, yield strength, tensile strength and elongation thereof were measured under the conditions of the chuck lengths of 50 mm and the tensile speed of 50 mm/min with Tensilon manufactured by Toyo Boldwin Co. (23° C.).

Preparation of compatibilizing agents

1. Compatibilizing agent X: 100 Parts of KODAR-PETG 6763 manufactured by Easton Chemical Co.[copolyester(terephthalic acid:ethylene glycol:cyclohexanedimethanol=100:65:35)] was admixed with 2 parts of maleic anhydride and 0.5 part of dicumyl peroxide, and the resulting mixture was kneaded at 250° C. with a biaxial extruder to produce a compatibilizing agent X. A graft ratio of maleic anhydride was 1.5 mol %.

2. 2,2'-(1,3-Phenylene)-bis(2-oxazolin) was used as a compatibilizing agent Y.

3. Compatibilizing agent Z: 49 Parts of maleic anhydride purified and dried according to a conventional manner, 71 parts of glycidyl methacrylate and 300 ml of methyl ethyl ketone were placed into a flask and then, as a polymerization initiator, a solution of 1.2 parts of benzoyl peroxide in methyl ethyl ketone was added in the flask.

The mixture was reacted with stirring at 80° C. for 5 hours in a stream of nitrogen. After the reaction was completed, the reaction mixture was allowed to cool to room temperature and it was poured into methanol to precipitate a polymer formed. The precipitate was filtered and dried under reduced pressure to obtain a compound having an epoxy and the anhydride group in a molecule thereof (yield 92%). The infrared spectrum (IR) of this compound has characteristic absorption peaks at 1785 $cm^{-1}$ and 930 $cm^{-1}$ and, therefore, it was confirmed that the compound had the acid anhydride and epoxy groups. This compound was used as a compatibilizing agent Z.

EXAMPLES 1 TO 8 AND COMPARATIVE EXAMPLES 1 TO 3

Polyethylene terephthalate (hereinafter referred to as PET) having intrinsic viscosity (η) of 0.75 was used as a polyester resin, polymetaxylylene adipamide (MXD resin) having relative viscosity (η rel) of 2.2 was used as a polyamide resin having metaxylylene group and the above compatibilizing agents X, Y and Z were used. These ingredients were kneaded in the amounts as shown in Table 1 to obtain polyester resin compositions. The resulting polyester resin compositions were molded into closed-end parisons of 25 mm in outer diameter, 130 mm in length and 4 mm in thickness by using M-100 type of an injection molding machine manufactured by Meiki Seisakusho K.K. These parisons were fitted to a parison-fitting part having rotatory driving means at the opening of the parisons, and heated during rotating in an oven having a far infrared rays heater until a surface temperature of the parisons reached to 110° C. Then, the parisons were transmitted into a blow molding die and blow-molded under the conditions of 22 cm/sec of shift speed of the orientation rod and 20 kg/$cm^2$ of compressed air pressure to obtain bottle-shaped hollow vessels of 265 mm in total length, 80 mm in outer diameter of the barrel part and 1000 ml in the internal volume. The properties of these vessels are shown in Tables 1 and 2.

TABLE 1

| | PET resin (wt %) | MXD resin (wt %) | Compatibilizing agent (wt %) | | Yield strength (kg/$cm^2$) | Transparency (%) | Haze (%) | Amount of oxygen permeation (cc/bottle · 24 hr · atm) |
| --- | --- | --- | --- | --- | --- | --- | --- | --- |
| Example 1 | 90 | 5 | (X) | 5 | 1124 | 85 | 6 | 0.35 |
| Example 2 | 85 | 10 | (X) | 5 | 1115 | 80 | 10 | 0.27 |
| Example 3 | 80 | 10 | (X) | 10 | 1113 | 82 | 9 | 0.28 |
| Example 4 | 70 | 20 | (X) | 10 | 1106 | 79 | 14 | 0.22 |
| Example 5 | 90 | 5 | (X) | 10 | 1126 | 88 | 4 | 0.37 |
| Example 6 | 70 | 10 | (X) | 20 | 1119 | 83 | 7 | 0.29 |
| Example 7 | 90 | 10 | (Y) | 0.5 | 1135 | 80 | 18 | 0.26 |
| Example 8 | 90 | 10 | (Z) | 0.5 | 1107 | 85 | 15 | 0.25 |
| Com. Example 1 | 100 | — | — | | 1107 | 90 | 2 | 0.56 |
| Com. Example 2 | 90 | 10 | — | | 1112 | 75 | 24 | 0.27 |
| Com. Example 3 | 80 | 20 | — | | 1109 | 68 | 30 | 0.20 |

TABLE 2

| | PET resin (wt %) | MXD resin (wt %) | Compatibilizing agent (wt %) | | Amount of oxygen permeation (cc/bottle · 24 hr · atm) | | Haze (%) | |
| --- | --- | --- | --- | --- | --- | --- | --- | --- |
| | | | | | 65% RH | 95% RH | 65% RH | 95% RH |
| Example 3 | 80 | 10 | (X) | 10 | 0.28 | 0.30 | 9 | 11 |
| Com. | 90 | 10 | | 0 | 0.27 | 0.31 | 24 | 29 |

TABLE 2-continued

| | PET resin (wt %) | MXD resin (wt %) | Compatibilizing agent (wt %) | Amount of oxygen permeation (cc/bottle · 24 hr · atm) | | Haze (%) | |
|---|---|---|---|---|---|---|---|
| | | | | 65% RH | 95% RH | 65% RH | 95% RH |
| Example 2 | | | | | | | |

As is clear from Table 1, the hollow molded article of the present invention has both improved transparency and gas barrier properties. Further, in appearance, transparency of the vessels greatly changes at 15 haze value.

As is clear from Table 2, the hollow molded article of the present invention has both improved gas barrier properties and transparency, even moisture absorption has taken place.

EXAMPLES 9 TO 11 AND COMPARATIVE EXAMPLES 4 TO 6

According to the same manner as described in Example 3, articles were produced except that compatibilizing agents having the compositions as shown in Table 3 were used instead of the compatibilizing agent X in Example 3. The results are shown in Table 3.

As is clear from Table 3, when a compatibilizing agent which was not modified with maleic anhydride was used as the ingredient C of the present invention, transparency and haze value of the resulting vessel considerably lowered.

TABLE 3

| | Compatibilizing agent (X) TPA/IPA/H$_6$-DMT/AA//EG/CHDM | Graft ratio of maleic anhydride (mol %) | Tensile strength (kg/cm$^2$) | Transparency (%) | Haze (%) | Amount of oxygen permeation (cc/bottle · 24 hr · atm) |
|---|---|---|---|---|---|---|
| Example 9 | 95/5/0/0//65/35 | 1.4 | 1101 | 85 | 7 | 0.25 |
| Com. Example 4 | 95/5/0/0//65/35 | 0 | 1096 | 74 | 26 | 0.28 |
| Example 10 | 80/0/0/20//100/0 | 1.2 | 1109 | 80 | 10 | 0.29 |
| Com. Example 5 | 80/0/0/20//100/0 | 0 | 1101 | 71 | 28 | 0.29 |
| Example 11 | 80/0/20/0//100/0 | 1.5 | 1110 | 81 | 9 | 0.28 |
| Com. Example 6 | 80/0/20/0//100/0 | 0 | 1104 | 73 | 27 | 0.28 |

(Note)
TPA: terephthalic acid; IPA: isophthalic acid; H$_6$-DMT: hydrogenated dimethylterephthalic acid; AA: adipic acid, EG: ethylene glycol; and CHDM: cyclohexanedimethanol.

What is claimed is:

1. A polyester resin composition which comprises 100 parts by weight of a thermoplastic polyester resin (A), 1 to 100 parts by weight of a polyamide resin having metaxylylene group (B) and 0.01 to 50 parts by weight of a compatibilizing agent (C), wherein the compatibilizing agent (C) is a modified copolyester resin obtained by grafting maleic anhydride to a copolyester of terephthalic acid, ethylene glycol and cyclohexane dimethanol.

* * * * *